US010071859B2

(12) United States Patent
Hellenbrand

(10) Patent No.: US 10,071,859 B2
(45) Date of Patent: Sep. 11, 2018

(54) PICKING DEVICE AND METHOD FOR OPERATING A PICKING DEVICE

(71) Applicant: CareFusion Germany 326 GmbH, Kelberg (DE)

(72) Inventor: Christoph Hellenbrand, Kaifenheim (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 236 days.

(21) Appl. No.: 14/835,538

(22) Filed: Aug. 25, 2015

(65) Prior Publication Data

US 2017/0057747 A1    Mar. 2, 2017

(51) Int. Cl.
*B65G 11/02* (2006.01)
*B65G 11/20* (2006.01)
(Continued)

(52) U.S. Cl.
CPC .............. *B65G 11/023* (2013.01); *B08B 3/00* (2013.01); *B65G 1/16* (2013.01); *B65G 11/163* (2013.01);
(Continued)

(58) Field of Classification Search
CPC ... B65G 11/203; B65G 11/023; B65G 11/163; B65G 1/1376; B65G 1/16; B65G 1/02;
(Continued)

(56) References Cited

U.S. PATENT DOCUMENTS 2,979,275 A * 4/1961 Garner .................... B21C 47/04
242/474.9
2,983,392 A * 5/1961 Ebbert ................ B65G 1/1376
198/370.01
(Continued)

FOREIGN PATENT DOCUMENTS

CN        103738633 A      4/2014
CN        103895998 A      7/2014
(Continued)

OTHER PUBLICATIONS

Extended European Search Report and Opinion for Application No. 15182275.6, dated Mar. 2, 2016, 14 pages excluding machine translation.
(Continued)

*Primary Examiner* — Glenn F Myers
(74) *Attorney, Agent, or Firm* — McDermott Will & Emery LLP

(57) ABSTRACT

A picking device for piece goods is disclosed, in which cleaning of the picking device is facilitated. The picking device may include a shelf row having shelf bases, each including a plurality of storage chutes, and a retrieving device, via which piece goods can be retrieved. A shelf base may include a frame structure, chute partitions, chute bases, and blocking devices, which are coupled to a control device. Two chute partitions and one chute base may define one elongate storage chute, assigned to each chute base is a support device, on which the chute base rests and which is designed such that another chute base can be slid between
(Continued)

the resting chute base and the support device. Assigned to each chute base is a holding means, which prevents the chute base from sliding in the longitudinal direction of the storage chute when the chute base is on the support device.

8 Claims, 10 Drawing Sheets

(51) Int. Cl.
*B65G 1/16* (2006.01)
*B08B 3/00* (2006.01)
*B65G 11/16* (2006.01)
*B65G 1/137* (2006.01)

(52) U.S. Cl.
CPC .......... *B65G 11/203* (2013.01); *B65G 1/1376* (2013.01); *B65G 2207/26* (2013.01)

(58) Field of Classification Search
CPC ... B65G 7/08; B08B 3/00; G07F 11/32; G07F 11/28
See application file for complete search history.

(56) References Cited

U.S. PATENT DOCUMENTS

| | | | |
|---|---|---|---|
| 3,788,516 A | 1/1974 | Knickerbocker | |
| 4,790,707 A * | 12/1988 | Magretta | A47B 57/402 211/187 |
| 4,923,070 A * | 5/1990 | Jackle | A47F 1/12 211/126.1 |
| 5,000,643 A * | 3/1991 | Tanaka | B65G 1/06 414/267 |
| 5,542,552 A * | 8/1996 | Yablans | A47F 1/126 211/43 |
| 7,028,852 B2 * | 4/2006 | Johnson | A47F 1/126 108/60 |
| 7,124,897 B2 * | 10/2006 | Bustos | A47F 1/126 211/59.3 |
| 7,124,898 B2 * | 10/2006 | Richter | A47F 1/12 211/59.3 |
| 9,415,429 B2 * | 8/2016 | Benedetti | B08B 9/0826 |
| 9,640,015 B2 * | 5/2017 | Stark | G07F 11/165 |
| 9,730,531 B2 * | 8/2017 | Hardy | A47F 1/126 |
| 2004/0188455 A1 * | 9/2004 | Shioya | G07F 11/165 221/123 |
| 2009/0101614 A1 | 4/2009 | Kirschner et al. | |

FOREIGN PATENT DOCUMENTS

| | | |
|---|---|---|
| EP | 1669308 A1 | 6/2006 |
| EP | 2093166 A1 | 8/2009 |
| EP | 2287814 A1 | 2/2011 |
| EP | 2727501 A1 | 5/2014 |

OTHER PUBLICATIONS

Phaust, "Pharmax—RG2 Ultra—Systeme robot + automate pour pharmacie", May 19, 2014, XP054976378, Retrieved from the internet: URL:https://www.youtube.com/watch?v=6kdrD6wg_71, 1 pg.

Reuschmarcom, "Consis E robot by Willach Pharmacy Solutions. mp4", Aug. 10, 2011, XP054976381, Retrieved from the internet: URL:https://www.youtube.com/watch?v=MobGmJ-Wx0M, 1 pg.

* cited by examiner

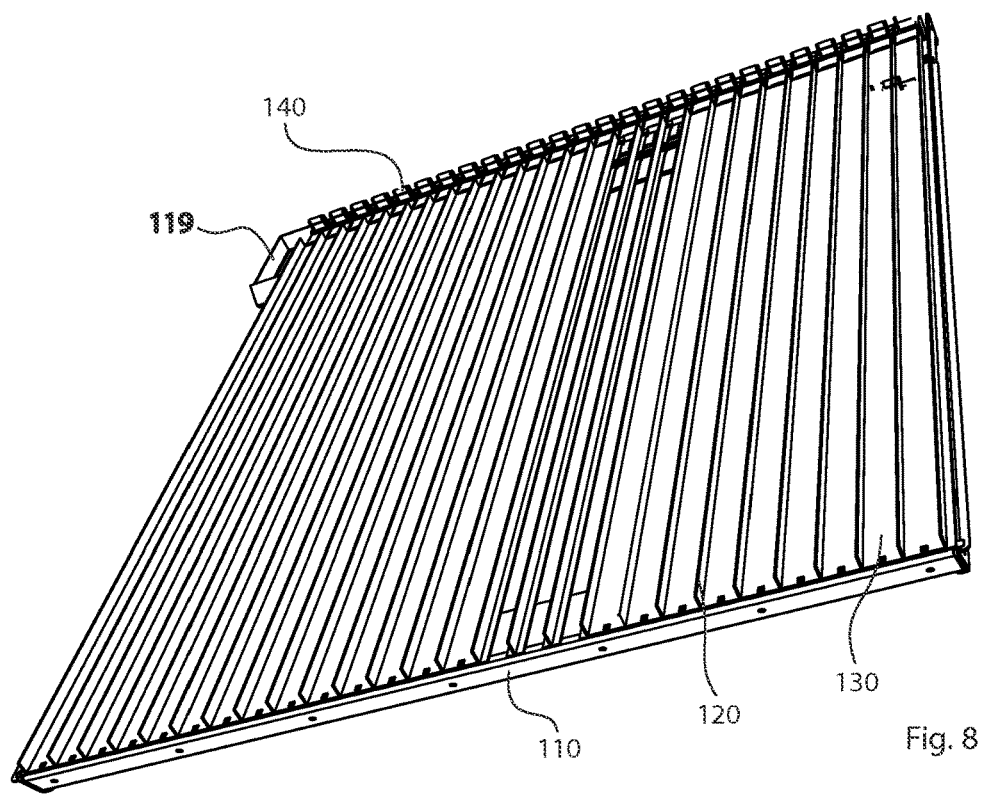
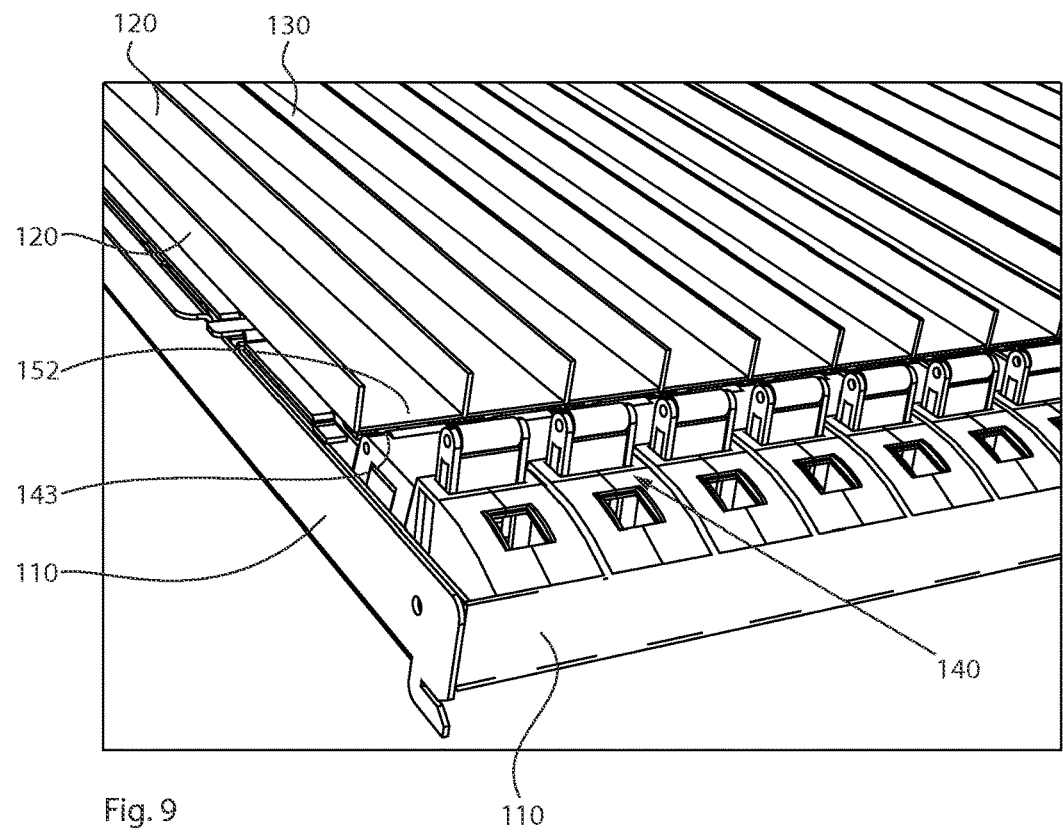

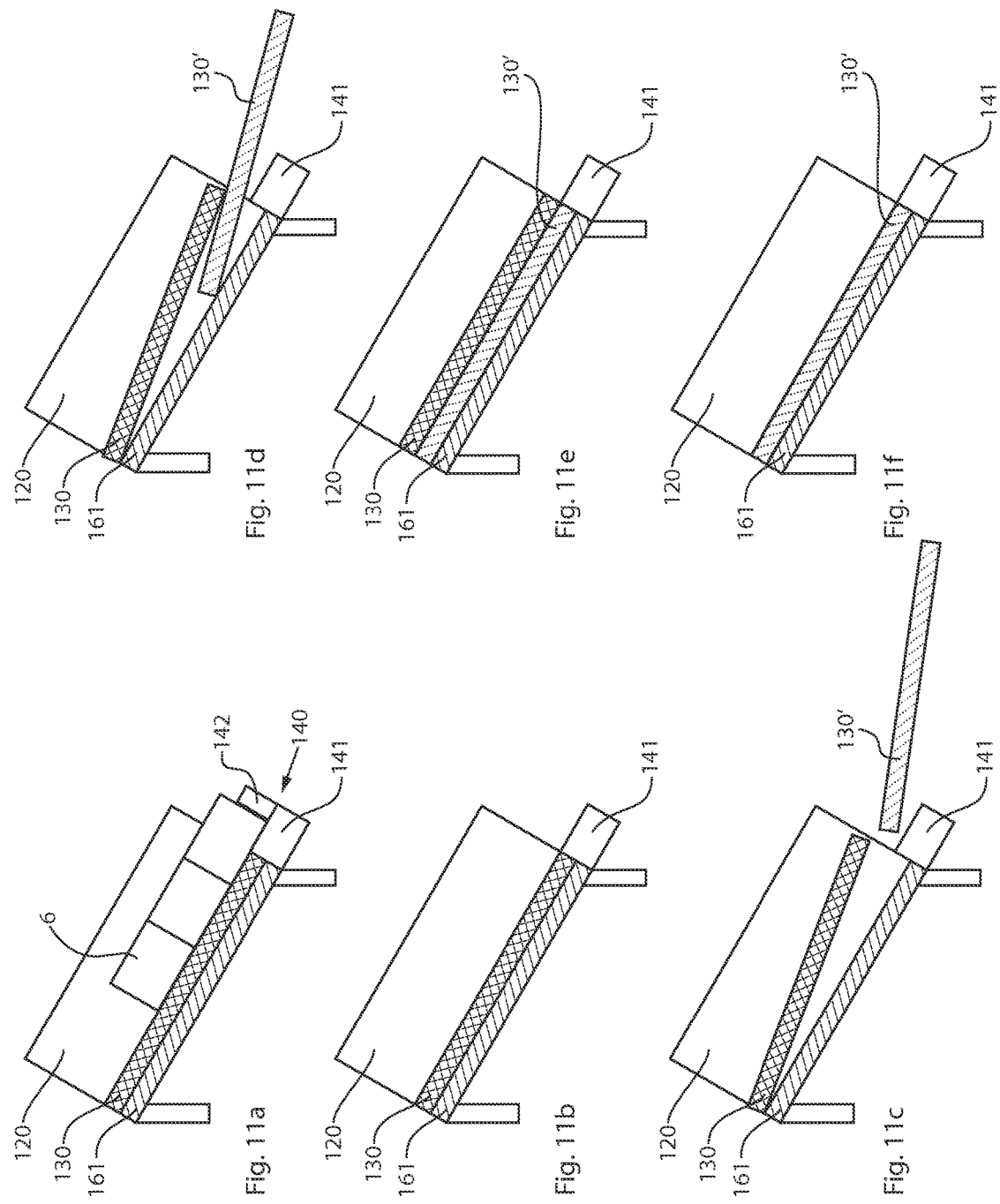

PICKING DEVICE AND METHOD FOR OPERATING A PICKING DEVICE

TECHNICAL FIELD

The present disclosure relates to a picking device for piece goods, in particular medicine packages, including a plurality of storage chutes, and to a method for operating such a picking device.

BACKGROUND

Automated or at least partially automated picking devices are often used in pharmacies for storing medicine packages in a space-saving manner. In the known picking devices that are suitable for pharmacies, the medicine packages are stored chaotically or according to type. In chaotic storage, the medicine packages are not always stored in the same storage locations in the device, but rather in the storage locations where there happens to be sufficient space. This makes it possible to avoid having an excessive amount of empty volume and to substantially increase the number of medicine packages stored per square meter of base surface area.

Medicine packages that are dispensed at a very high frequency (so-called "fast movers") are often stored in storage chutes according to type. Each storage chute has, at the lower end thereof, a blocking device, which can be activated by a control device and by means of which one or more medicine packages can be retrieved from the storage chute. The number of different medicines that can be stored by means of a picking device having type-specific storage chutes corresponds at most to the number of type-specific storage chutes.

The exact design of a picking device depends on the particular requirements of the site, i.e., there are picking devices having exclusively chaotic storage, picking devices having exclusively type-specific storage in storage chutes, and picking devices in which both types of storage are combined.

Independently of the manner in which the medicine packages are stored, soiling of the picking device with medicine residue, packaging material residue, or dust can be problematic, since it is extremely time-consuming to clean the storage locations for chaotic storage and/or type-specific storage. In order to clean, e.g., storage chutes used to store medicine packages according to type, an entire shelf base including a plurality of storage chutes is typically removed from the picking device and is replaced with a clean shelf base, or the entire shelf base is cleaned in the state thereof installed in the picking device. With respect to both methods, it is absolutely necessary that all medicine packages be removed from the storage chutes before cleaning. Independently of which of the known methods is used to clean the storage chutes, the downtime of the storage chutes or, possibly, the entire picking device, is considerable.

SUMMARY

The disclosed embodiments provide a picking device, in which the downtimes for cleaning the picking device are reduced. The disclosed embodiments also provide a method for operating a picking device, which also reduces the aforementioned downtimes.

The disclosed embodiments provide a picking device that includes at least one shelf row having at least one shelf having a plurality of shelf bases, which are arranged one above the other, each extend in a plane, and each include a plurality of storage chutes. The picking device can include a further shelf row having at least one shelf having a plurality of shelf bases, which are arranged one above the other and each extend in a plane, in which these shelf bases can include storage chutes or compartments for chaotic storage.

According to some embodiments, the picking device further includes at least one retrieving device, by means of which piece goods can be retrieved from the picking device. The retrieving device can be a conveyor belt, for example.

According to some embodiments, at least one of the shelf bases includes a frame structure, a plurality of chute partitions, a plurality of chute bases, and a plurality of blocking devices, which are coupled to a control device, in which, in each case, two chute partitions and one chute base define one elongate storage chute having a stocking end and a retrieving end, in which one of the blocking devices is arranged at each of the retrieving ends. Each shelf base may include a plurality of elongate storage chutes, which are loaded with piece goods by an operating device or by hand via the stocking end and, at the retrieving ends of which, piece goods are dispensed via the blocking devices.

According to some embodiments, assigned to each chute base is a support device, on which the chute base rests and which is designed and configured such that another chute base can be slid between the resting chute base and the support device. The chute bases are therefore not fixedly connected to the support device, but rather merely rest thereon such that another chute base can be slid underneath the resting chute base, in which the exact design of the support device and the chute bases may be modified such that another chute base can be slid underneath.

According to some embodiments, assigned to each chute base is a holding means, which prevents the chute base from sliding in the longitudinal direction of the storage chute when the chute base is placed on the support device. The holding means can be formed on the chute base itself or on another component; the essential point is that the chute base is prevented from sliding in the longitudinal direction of a storage chute.

According to some embodiments, a support device is provided, in which this support device is designed and configured so as to be coordinated with the chute bases such that another (clean) chute base can be slid underneath the chute bases that are present (and are soiled). After the new chute base is slid underneath, the original, soiled chute base is removed.

According to some embodiments, it is therefore possible to easily and quickly replace those chute bases that are the most soiled, naturally, with clean chute bases by the piece goods resting thereon. There is no need to remove a shelf base having a plurality of storage chutes nor is there a need to clean all the storage chutes in the very tight spaces in the interior of the picking device. With respect to cleaning the chute bases "on site," the ease of replacing soiled chute bases with clean chute bases has the further advantage that the contaminants located on the chute bases are not stirred up during cleaning and do not settle in other parts of the picking device.

Soiled chute bases can therefore be rapidly and easily replaced with cleaned chute bases, thereby considerably reducing the cleaning-induced downtimes of the picking device according to the disclosure. Given that the new shelf base is slid underneath, there is also no need to remove all the medicine packages that are present on a storage chute before cleaning this storage chute. The medicine packages can remain in the storage chute and this storage chute can be cleaned anyway by replacing an old chute base with a new chute base. This is another great advantage provided by the picking device according to the disclosure in contrast with conventional devices.

According to some embodiments, the storage chutes can be filled manually by a user. Given that the piece goods are stored according to type, filling can be carried out relatively easily by a user. In the case of picking devices having mixed storage, in particular, i.e., having storage chutes for type-specific storage and compartments for chaotic storage, it is preferable, however, for the picking device to include an operating device, which can be displaced horizontally and vertically in front of the shelf row and which is coupled to the control device, and at least one stocking device, by means of which piece goods can be moved into the picking device and from which the operating device can remove piece goods. According to some embodiments, the storage chutes and the compartments can be filled by means of the operating device. As an alternative, the storage chutes can be filled manually, but the chaotic storage on the compartments can be carried out by means of the operating device. According to some corresponding embodiments, piece goods to be stored according to type and chaotically can be stocked quickly and reliably by means of the operating device.

According to some embodiments, the support device and the chute bases are designed and configured such that a further chute base can be slid underneath the resting chute base. This is achieved in a manner having a particularly simple design in that the chute bases are supported so as to be movable along the vertical axis (z) of the storage chutes. A resting end is lifted, i.e., is moved along the vertical axis, in order to insert a new chute base, and a new chute base is slid underneath.

According to some embodiments, the elongate storage chutes are each defined by two chute partitions and one chute base, in which a support device is assigned to each chute base. The support device can be fastened, e.g., on the frame structure of a shelf base, and can be routed, in sections, underneath the chute bases such that it is possible, according to the disclosure, to slide a chute base underneath a resting chute base.

In some embodiments having a very simple design, the chute partitions have support sections, in which, in each case, two support sections of two chute partitions form one support device, on which a chute base rests.

According to some embodiments, a holding means is assigned to each chute base in order to prevent a chute base from sliding in the longitudinal direction of the storage chute when the chute base is placed on the support device. The exact design thereof and where such a holding means is arranged, e.g., in a chute base, depends specifically on the exact design of the storage chutes. With respect to the design and arrangement of the holding means, it is furthermore significant whether the new chute base is slid underneath from the stocking end or the retrieving end of the storage chute. As indicated above, an operating device can be displaced horizontally and vertically in the interior of the picking device, and therefore the space in the interior of the picking device (i.e., at the stocking end of the storage chutes) is very tight, and working with chute bases in the interior of the picking device is not advantageous. In an embodiment of the picking device according to the disclosure, it is therefore provided that the holding means is formed at the section corresponding to the stocking end of a storage chute. It is therefore not necessary to fix the chute base via a holding means at the retrieving end of the chute base, and therefore a new chute base can be slid underneath at the retrieving end. The retrieving ends of the storage chutes may be easy to reach by removing a side panel of the picking device, which can be merely hung in place according to some embodiments.

Depending on the length of the chute bases, it can be difficult to work with these, in particular shortly before sliding underneath an old chute base. In order to enable a new chute base to be slid underneath or to simplify insertion even in spatially constricted conditions, it is provided according to some embodiments that the chute bases have at least one articulated section.

Even though the systems of the present disclosure permits replacing soiled chute bases with substantially reduced operational downtimes, it is still preferable for cleaning to be carried out only when soiling of the chute reaches a desired threshold. According to some embodiments, the chute bases therefore include a sensor, which is coupled to the control device and can determine a degree of soiling of a chute base and forward this to the control device. The sensor can be an optical sensor that determines when the image obtained by the sensor becomes too obscure to recognize characters. In some embodiments, the soiling threshold may be a factor of light that is gathered by the sensor, and when the sensor's gathered light drops below a certain threshold, a processor may determine that the chute base is sufficiently soiled and should be replaced. When the degree of soiling of a chute base is known, it is possible to initiate a replacement only when it is particularly desirable due to the degree of soiling.

As an alternative, the chute bases can include a combination detection and display device, which can determine and display a degree of soiling of a chute base.

Furthermore, a sensor for monitoring the fill level can be assigned to a storage chute. This sensor can be used to also detect packages that are stuck or that are not sliding (e.g., due to a material defect on the packaging).

A further sensor can be assigned to a blocking device, which detects whether the requested piece good is actually dispensed when the blocking device is released.

The disclosure further provides a method for operating a picking device. According to some embodiments, a picking device includes a shelf row having at least one shelf having a plurality of shelf bases, which are arranged one above the other, each extend in a plane, and each include a plurality of storage chutes, in which at least one of the shelf bases has a frame structure, a plurality of chute partitions, a plurality of chute bases, and a plurality of blocking devices, in which, each chute base, along with two chute partitions, define one elongate storage chute having a stocking end and a retrieving end. Assigned to each of the retrieving ends is a blocking device and assigned to each chute base is a support device, on which the chute base rests, and which is configured such that another chute base can be slid underneath the resting chute base, where assigned to each chute base is a holding means, which prevents the chute base from sliding in the longitudinal direction X of the storage chute when the chute base is placed on the support device.

According to some embodiments, an old or soiled chute base resting on a support device is lifted at the retrieving end or the stocking end of the corresponding storage chute, and a cleaned or clean chute base is slid underneath the old chute base on the support device. Finally, the old chute base is removed and the new chute base is fixed against sliding.

According to some embodiments, it is therefore no longer necessary to remove an entire shelf base, including a plurality of storage chutes, from the picking device in order to clean the storage chutes, or to clean the storage chutes in the machine itself, which usually causes a considerable portion of the contaminants to become stirred up and settle at another location within the picking device. Given that only the most contaminated parts, i.e., the chute bases, are removed, and this is carried out, according to the disclosure, quickly and without complex measures, the cleaning-induced downtimes of the picking device can be greatly reduced. The new chute bases can be slid underneath the resting chute bases with the stocking end of a storage chute resting on the support device. In order to do this, the chute base simply lifted at the retrieving end and the new chute base is slid in. A corresponding procedure is indicated when the retrieving ends of the chute bases can be easily accessed, e.g., when an outer wall of the picking device is easy to access and remove.

The new chute bases can be inserted at the stocking ends of the storage chutes. According to some embodiments of the method according to the disclosure, the chute bases are wedge-shaped, at least in sections, at the stocking end, and an old chute base resting on a support device is lifted at the stocking end of the corresponding storage chute by inserting a new chute base, in which the new chute base is configured, at the retrieving end, to be complementary to the stocking end of the old chute base.

According to some embodiments, the new and the old chute bases are designed and configured, in sections, such that, upon insertion, the eventual retrieving end of the new chute base automatically lifts the stocking end of the resting chute base, thereby simplifying the procedure of sliding the new chute base underneath.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 8 shows another view of a shelf base, without chute bases, according to an embodiment;

FIG. 9 shows a detailed view of the retrieving end of a shelf base, according to an embodiment;

FIGS. 11a to 11f schematically show the sequence of an embodiment of the method according to the disclosure.

DETAILED DESCRIPTION OF THE PREFERRED EMBODIMENTS

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 1:
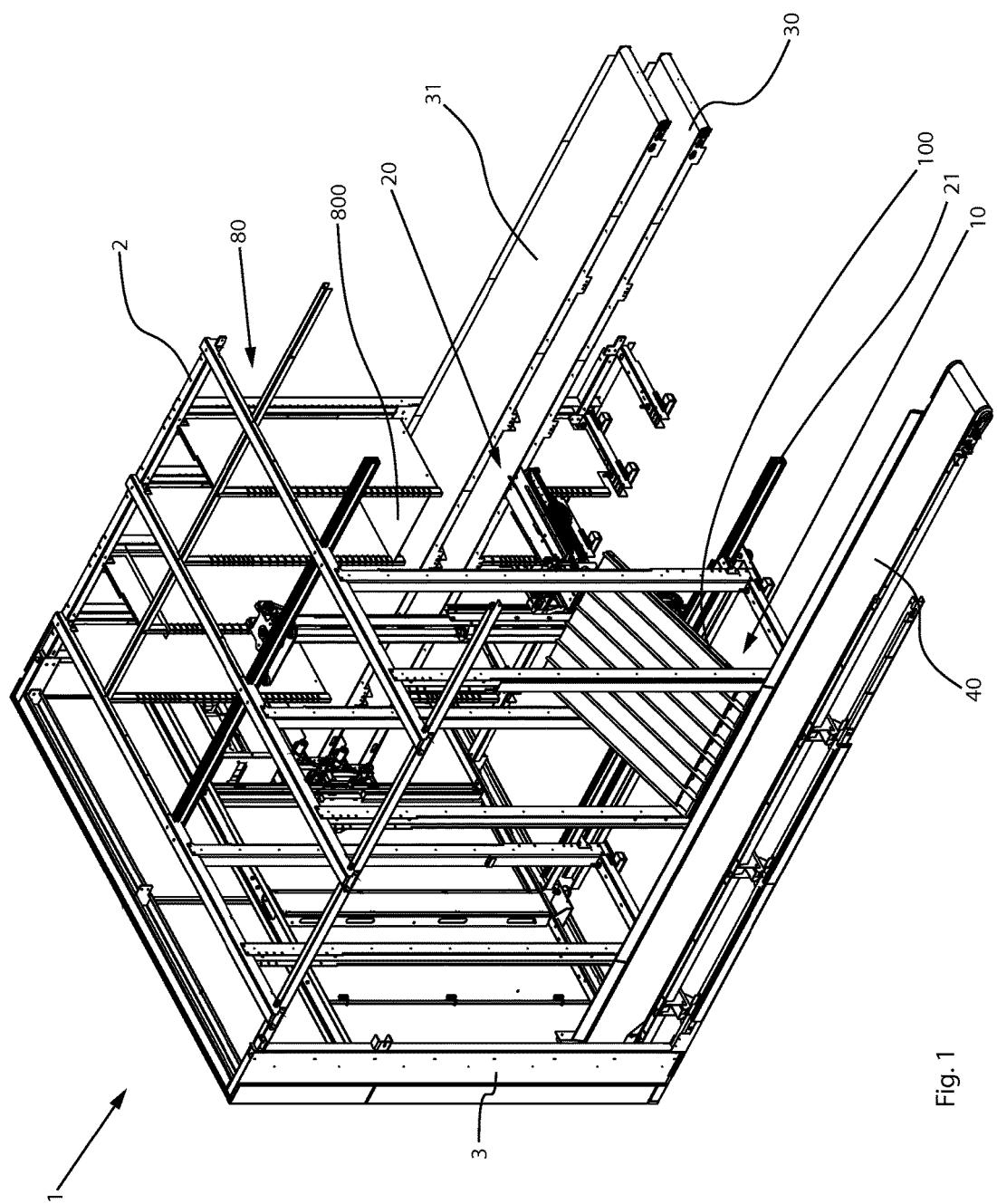
FIG. 1 shows a perspective view of a first embodiment of the picking device.

FIG. 1 shows a perspective view of a picking device 1 according to an embodiment, where a portion of the elements of the picking device, such as a large portion of the frame structure 2 and a large portion of the external covering 3, for example, is not shown for clarity. The picking device 1 includes a first shelf row 10 having a plurality of shelves, each of which has a plurality of shelf bases 100, which slant downward toward the outside and are arranged one above the other (where only one shelf base 100 is shown in FIG. 1; additional shelf bases can be arranged above and next to the shelf base that is shown). The individual shelves of the first shelf row 10 are formed by (non-illustrated) shelf walls and a plurality of the aforementioned shelf bases 100. The slanted shelf bases 100 include a plurality of storage chutes, which are described in greater detail with reference to the following figures. Medicine packages are usually stored in these storage chutes according to type, i.e., only one type of medicine package is stored in each storage chute.

A second shelf row 80 is arranged opposite the first shelf row 10 and includes a plurality of shelves, which have shelf bases 800 extending in a horizontal plane, where, in the embodiment shown, only one shelf base 800 is shown for the second shelf row 80 as well. In contrast to the first shelf row 10, the shelf bases 800 of the second shelf row 80 are designed as simple compartments without storage chutes, i.e., medicine packages can be stored chaotically on the shelf bases 800.

In the embodiment shown in FIG. 1, two stocking devices 30, 31 are integrated into the second shelf row 80, said stocking devices being designed as conveyor belts in the embodiment shown. The stocking devices are typically arranged and dimensioned such that said stocking devices terminate at stocking edges of the shelf bases 800. Such an arrangement of the stocking devices and the shelf bases makes it particularly easy for medicine packages to be removed from the stocking devices and placed onto the shelf bases.

A retrieving device 40 is arranged underneath and in front of the slanted shelf bases 100, where medicine packages arranged in the slanted storage chutes fall onto said retrieving device when the blocking devices of the slanted storage chutes are released, and via which said retrieving device the requested medicine packages are moved out of the picking device. In the embodiment shown in FIG. 1, the retrieving device 40 is also designed as a conveyor belt.

An aisle is formed between the first and the second shelf rows 10, 80, the width of which is defined by the distance between the stocking edges of the respective shelf bases 100, 800, where the stocking edges of the various shelf bases of the first and the second shelf rows are preferably arranged in a vertical plane. In the aisle, the operating device 20 can be moved horizontally and vertically on a corresponding guide, where the horizontal guide 21 of the operating device 20, in particular, is evident in FIG. 1.

The embodiment shown combines type-specific and chaotic storage and therefore includes one operating device and two stocking devices in the form of a conveyor belt. In alternative embodiments including storage chutes only, the operating device and/or the stocking devices can be omitted.

Figure 2:
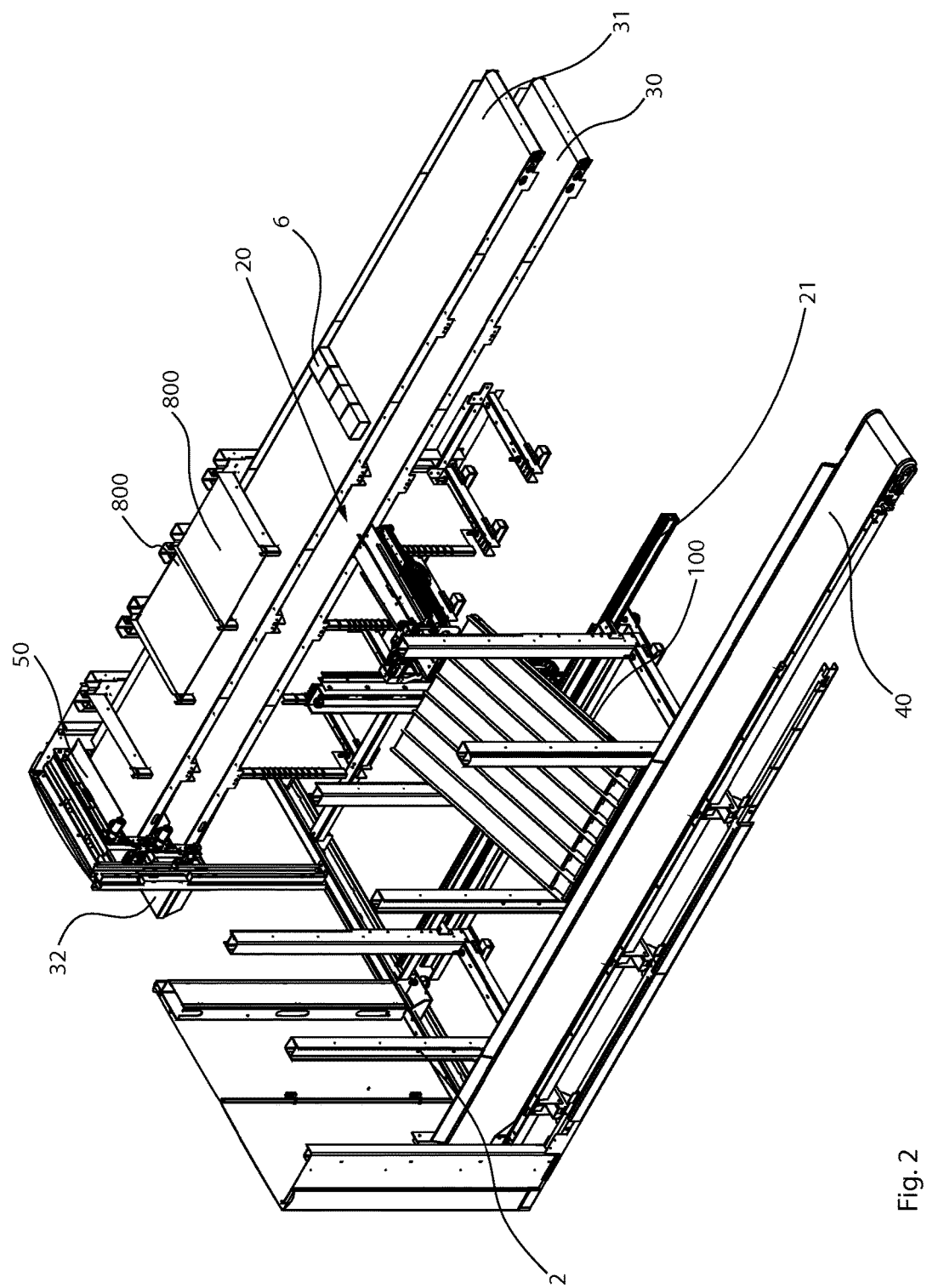
FIG. 2 shows a sectional view of the embodiment shown in FIG. 1.

FIG. 2 shows a sectional view of the embodiment shown in FIG. 1, in which the upper half of the picking device has been omitted. This sectional view shows, in particular, the arrangement of the slanted shelf bases 100 and the horizontal shelf bases 800. Furthermore, it is evident that the front faces of the horizontal shelf bases 800 and the sides of the retrieving devices 30, 31 all lie in a plane. This view furthermore clearly shows that an identification device 50 is assigned to each retrieving device 30, 31, by means of which data related to medicine packages lying on a stocking device can be detected. Furthermore, it is evident that the stocking devices have an external section 32, which extends beyond the front area of the picking device and on which the medicine packages to be stored can be placed for storage. A few medicine packages 6 are shown on the upper stocking device 30 in this figure, as an example.

Figure 3:
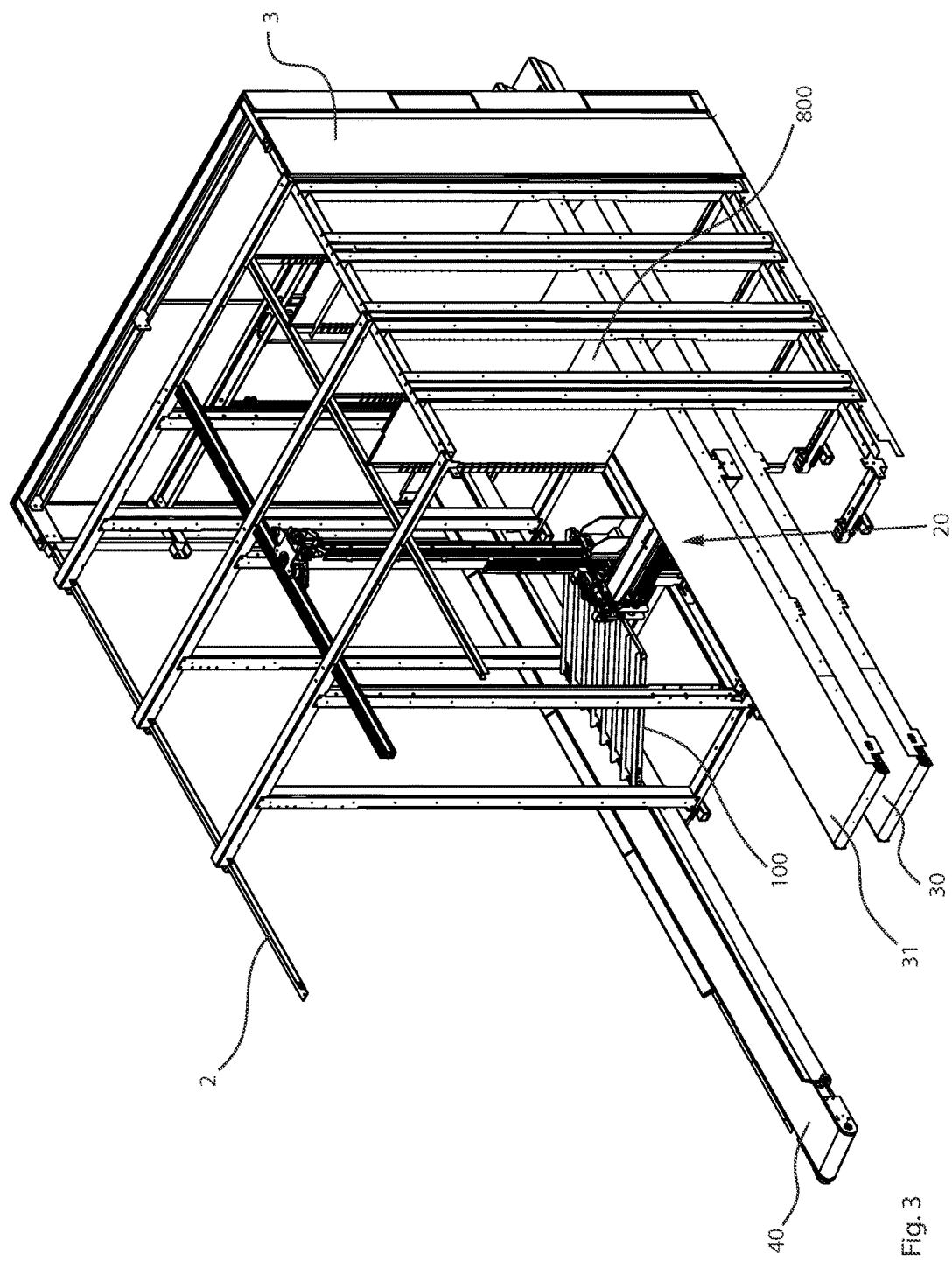
FIG. 3 shows another perspective view of the embodiment of FIG. 1.

FIG. 3 shows an alternative perspective view of the embodiment, which has already been shown in FIG. 1, where this view shows the picking device from another side.

Figure 4:
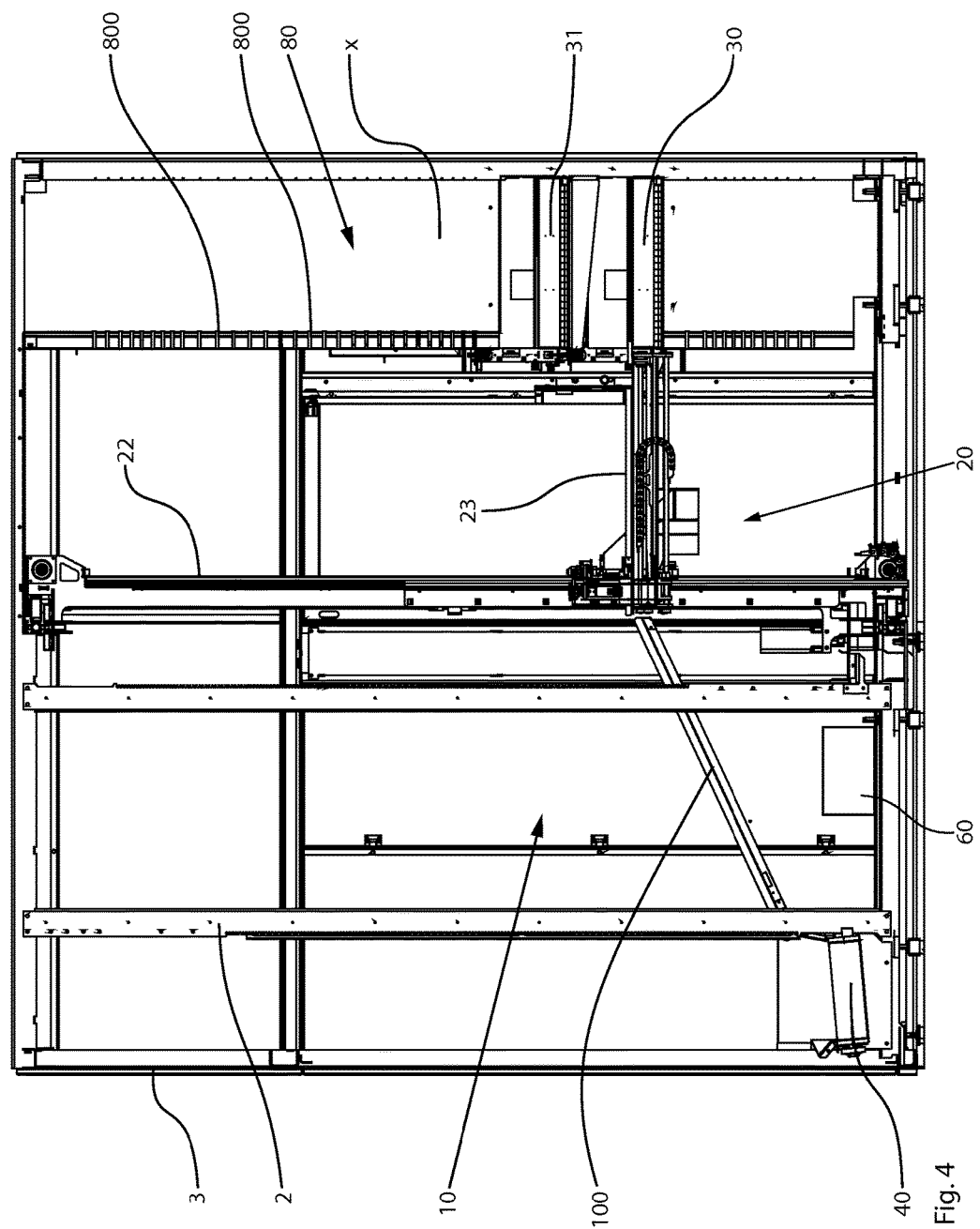
FIG. 4 shows a rear view of the first embodiment of FIG. 1.

FIG. 4 shows a rear view of the first embodiment of the picking device according to the disclosure, where the external covering has been omitted in order to show a portion of the interior of the picking device. The two shelf rows 10, 80, which are arranged opposite one another, are evident, where only one or two shelf bases, respectively, of the shelf rows are shown, for clarity. The aisle is formed between the first and the second shelf rows, in which said aisle the operating device 20 can be moved horizontally and vertically, where the vertical guide 22, in particular, is evident in FIG. 4. The operating device 20 includes a gripping device 23, which spans the entire aisle and can therefore bridge the distance between the first and the second shelf rows without the need to be displaced for this purpose. As is clearly evident in this representation, the slanted shelf bases 100 are slanted outwardly away from the aisle, toward the retrieving device 40. Furthermore, the control device 60 is indicated in FIG. 4, said control device being coupled to the operating device 20.

Figure 5A:
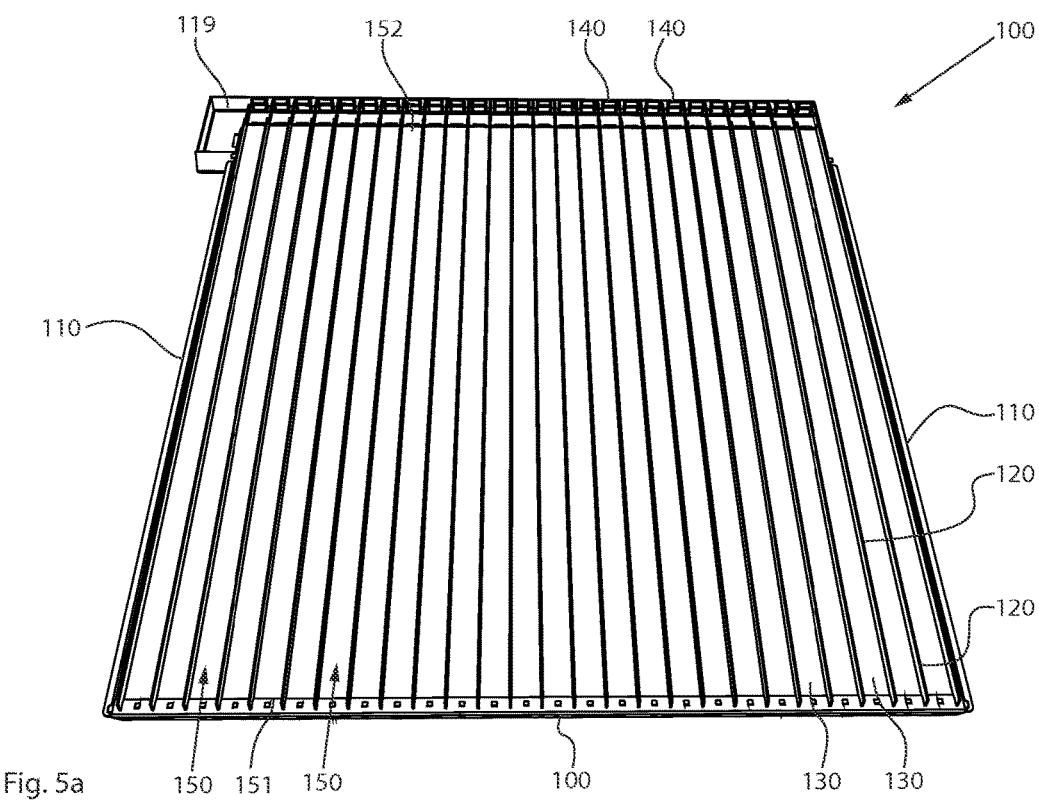
FIGS. 5a and 5b show a shelf base of the first embodiment of FIG. 1.
Figure 5B:
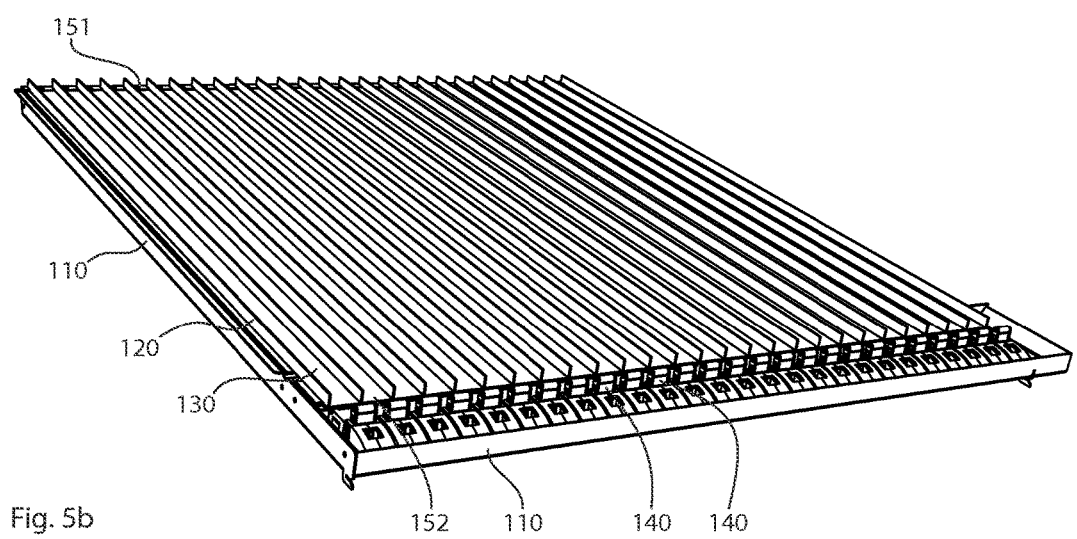

FIGS. 5a and 5b show detailed views of a shelf base 100 having a substantially square frame structure 110, which has a bulge 119 in the "upper left" corner. A plurality of parallel chute partitions 120 is arranged on the frame structure 110, and one chute base 130 is arranged between every two chute partitions 120. In each case, two chute partitions and one chute base define one elongate storage chute 150, where each storage chute 150 has a stocking end 151 and a retrieving end 152. A blocking device 140 is arranged at the retrieving end 152 of each storage chute 150 and is coupled to the (non-illustrated) control device. FIG. 5a shows the shelf base from the stocking side, and FIG. 5b shows the shelf base from the retrieving side. In the picking device according to the present disclosure, the shelf bases are usually arranged at a slant, specifically such that the retrieving end of the shelf base is slanted toward the retrieving device, which is not shown here. The shelf bases themselves are fastened to vertical braces of the shelves or shelf rows by means of (non-illustrated) fastening means.

Figure 6A:
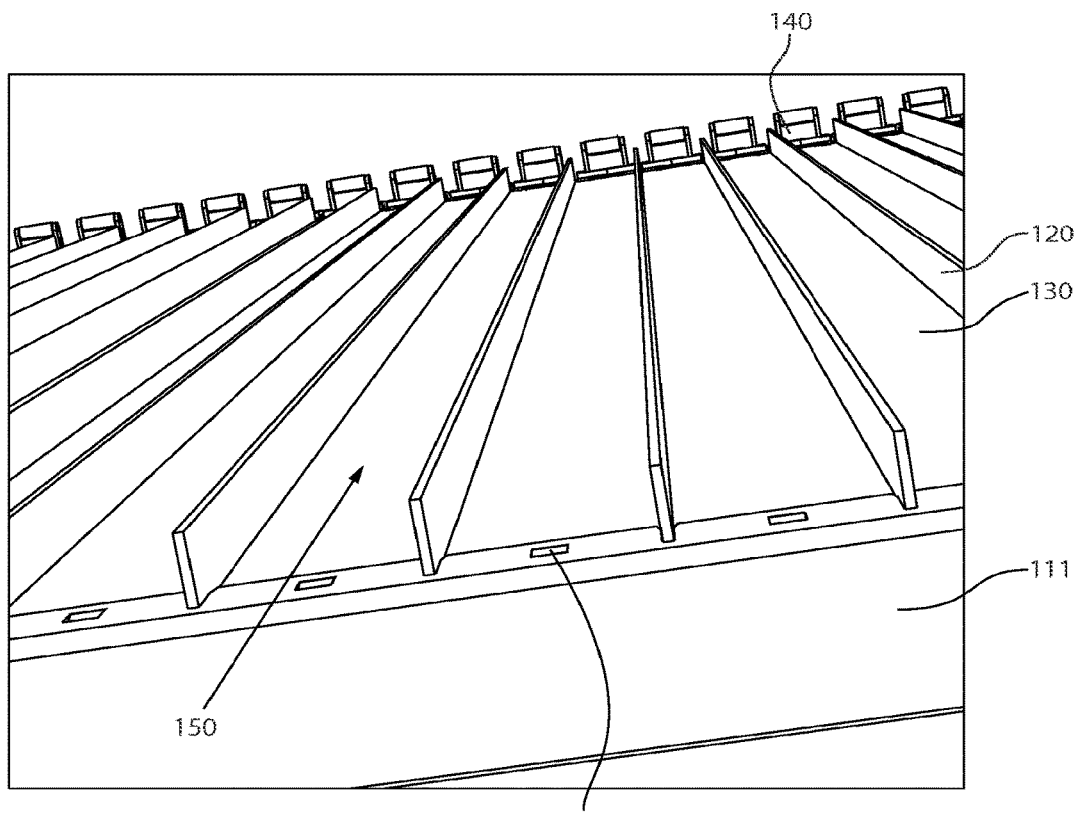
FIGS. 6a and 6b show detailed views of a shelf base of the first embodiment of FIG. 1.
Figure 6B:
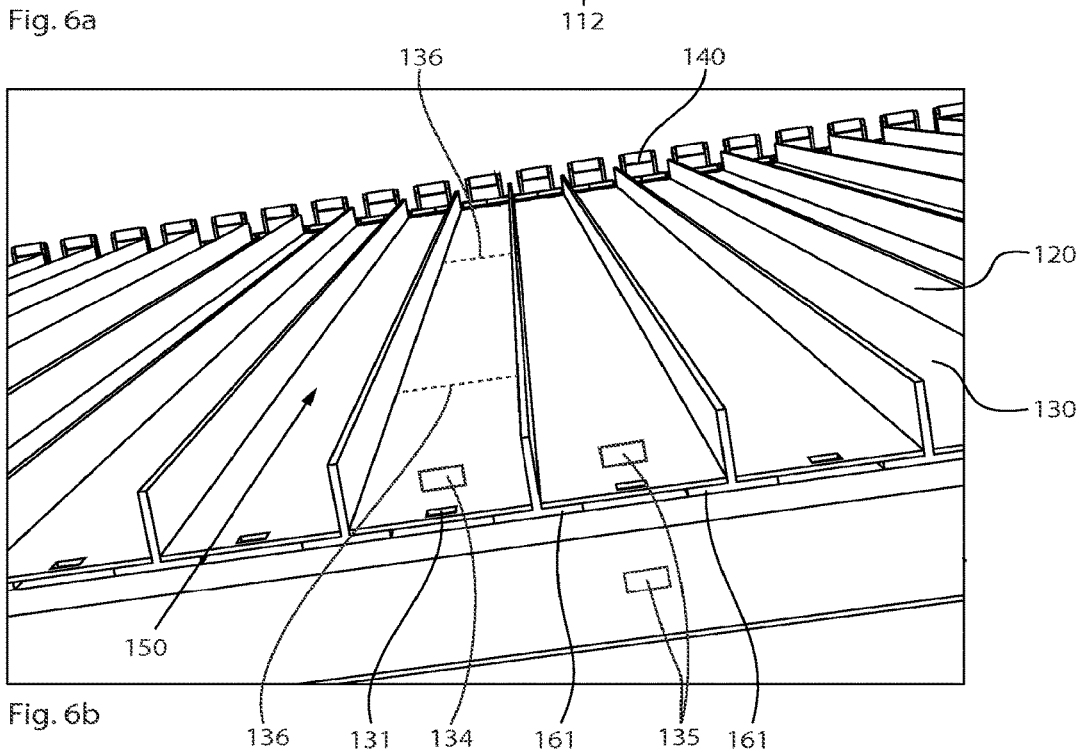

FIGS. 6a and 6b show detailed views of the stocking front face of a shelf base. A retaining plate 111 is arranged at the stocking front face, where a section of this retaining plate that is parallel to the plane of the chute bases slightly overlaps these chute bases. This section of the retaining plate 111 includes a plurality of holders 112, which are cantilevered toward the chute bases, where one such holder 112 is assigned to each chute base.

A sensor 134, which is coupled to the control device, is indicated in a chute base in FIG. 6b, where said sensor determines the degree of soiling of the chute base and forwards this information to the control device. On the basis of the information from a plurality of such sensors, a decision can be made to clean a few or all of the storage chutes of a shelf base, i.e., to replace the old chute bases with new chute bases. As an alternative, a detection and display device 135 can be used, which is also indicated in only one chute base. This can be coupled to the control device, although this is not necessary. A need for cleaning can be displayed on the shelf base itself.

Furthermore, two articulated regions 136 are indicated in the shelf base having the sensor 134, where said articulated regions permit bending orthogonally relative to the longitudinal direction in order to make it easier to work with the shelf base when sliding underneath a shelf base that is present.

The retaining plate 111 that is indicated in FIG. 6a has been left out of FIG. 6b, and it is evident that each chute base 130 includes a holding means 131 designed as an opening, where one such holding means interacts with a holder 112 of the retaining plate 111 and thereby prevents the chute base from sliding in the longitudinal direction of the storage chutes.

FIG. 6b furthermore shows that the chute bases rest on support sections 161, which are designed as parts of the chute partitions, where two support sections 161 form one support device 160. In the embodiment shown in FIG. 6b, the chute partitions are therefore T-shaped, where the two legs are the support sections. As shown, the chute bases are temporarily fixed with respect to the vertical axis z (orthogonally relative to the plane of the chute bases) via the retaining plate 111 only at the stocking end of the shelf bases. However, even when the retaining plate 111 is present, the chute bases are supported at the retrieving end of the chute bases so as to be movable relative to the vertical axis, since, in this region, said chute bases merely rest on the support device 160, which is formed by the support sections 161.

Figure 7A:
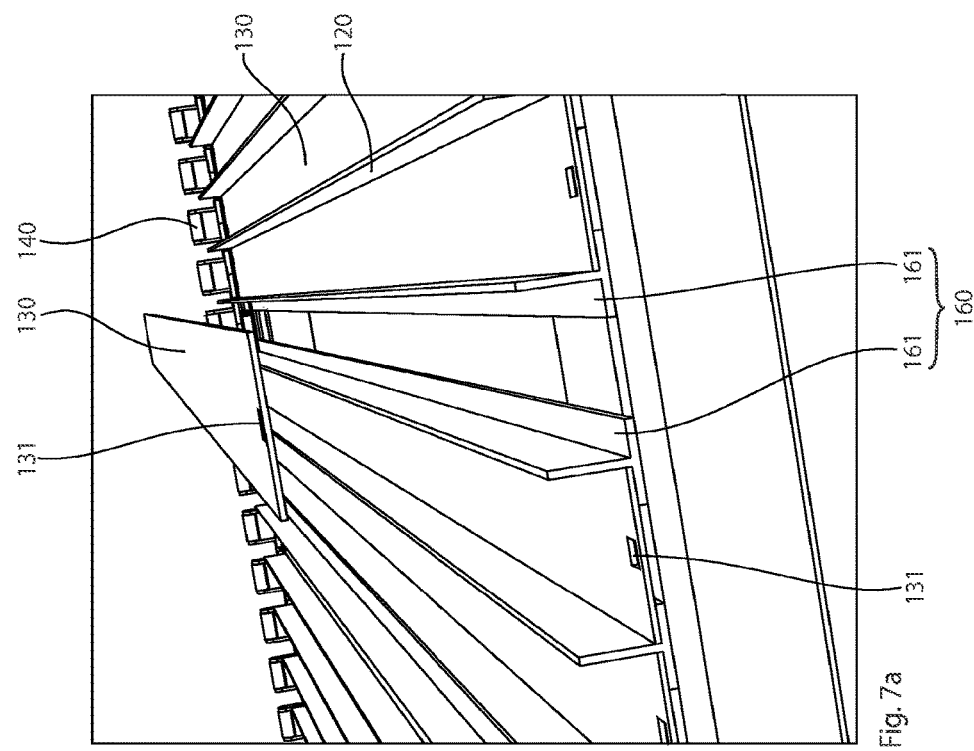
FIGS. 7a and 7b show further detailed views, without the chute base, according to an embodiment.

FIG. 7a shows the design of the support sections 161, which are designed as sections of the chute partitions 120. In FIG. 7a, a chute base 130 having holding means 131 has been moved upwardly, and it is evident that the support device extends along nearly the entire length of the storage chute. Furthermore, it is evident that the retrieving end of each storage chute rests against an assigned blocking device 140 such that, as an alternative to the holding means 131 shown, a section of the blocking device also provides a holding means 143, which prevents a chute base from sliding in the longitudinal direction.

Figure 7B:
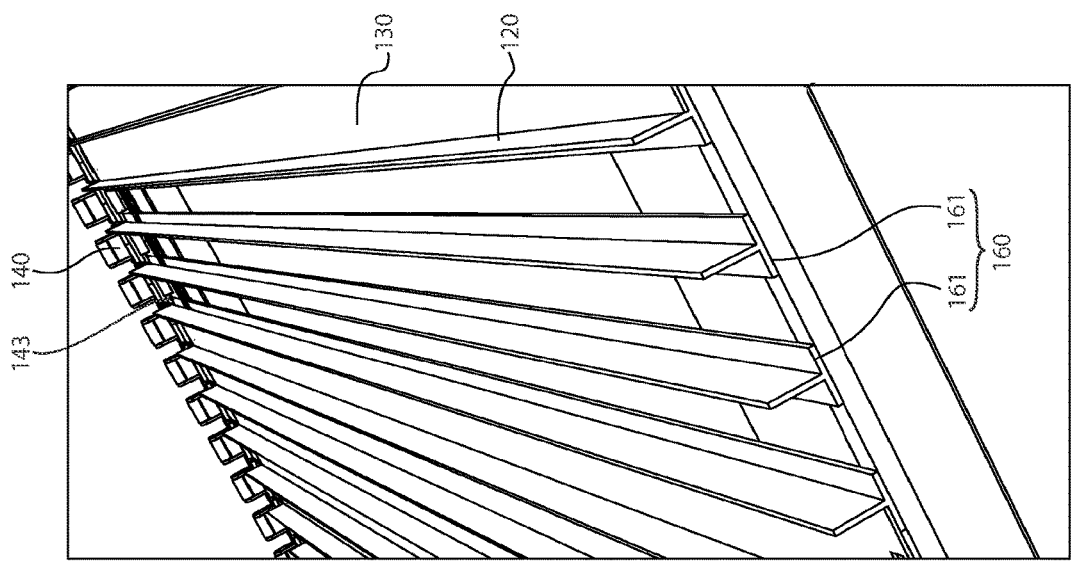

In FIG. 7*b*, a shelf base is shown with three chute bases left out, for clarity. The alternative holding means 143 is also evident in this illustration.

In FIG. 8, a complete shelf base is shown once more with three chute bases left out, for clarity.

FIG. 9 shows a detailed view of the retrieving end of the shelf base, where it is evident that the retrieving ends 152 of the chute bases or storage chutes rest against a holding means 143 of the blocking device. Furthermore, it is clearly evident that a blocking device 140 is assigned to every single storage chute 150, thereby making it possible to operate all of the available storage chutes 150 of a shelf base separately from one another.

Figure 10A:
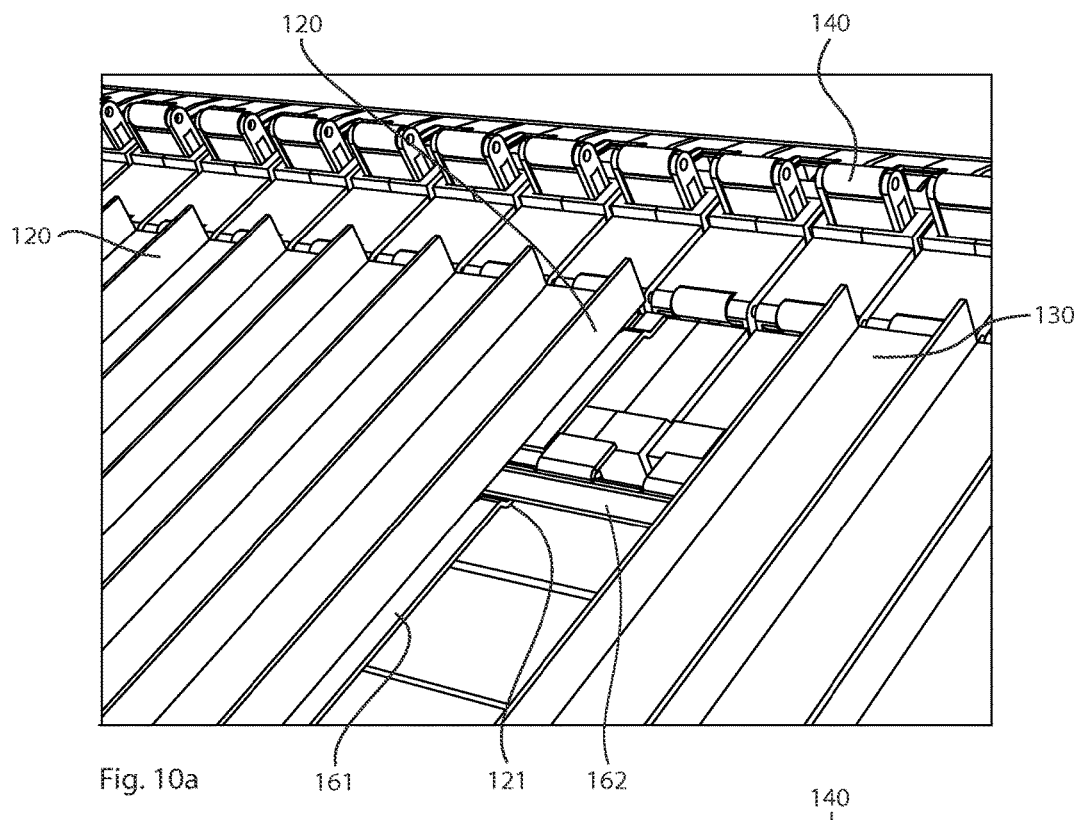
FIGS. 10a and 10b show further detailed views of the retrieving end, without the chute base, according to an embodiment.
Figure 10B:
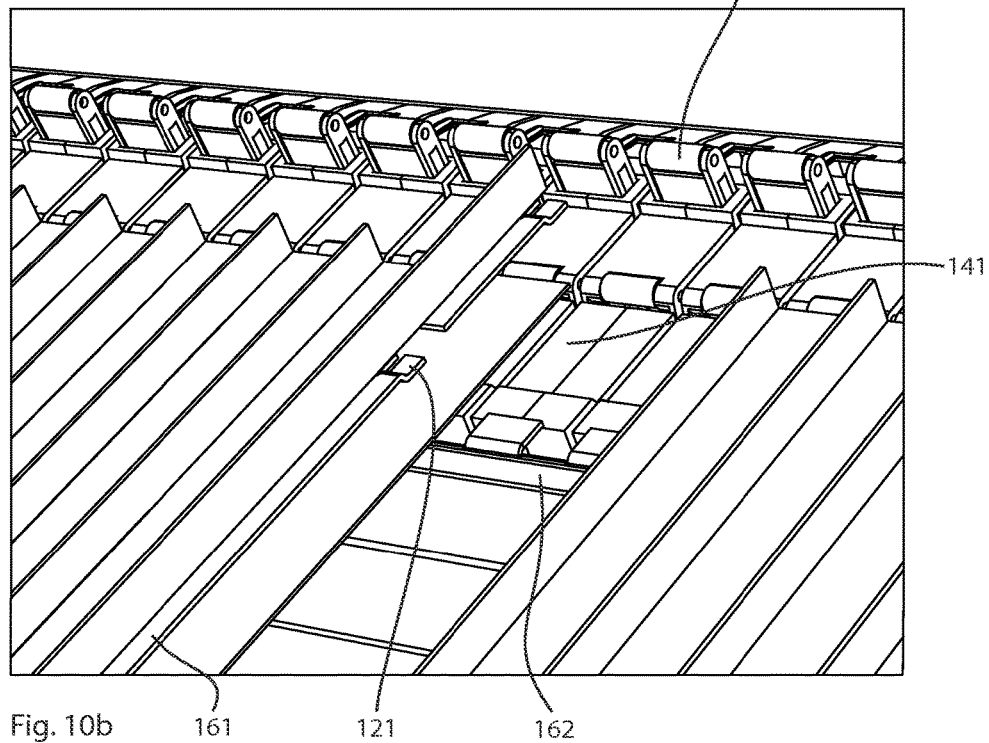

FIGS. 10*a*, 10*b* show detailed views of the retrieving end of a shelf base, where two adjacently arranged shelf bases and the corresponding chute partition are left out of FIGS. 10*a* and 10*b*. In both figures, it is evident that the support section 161 of a chute partition extends along nearly the entire length. Furthermore, it is evident that the chute partitions are fastened via a clamping section 121 on a support brace 162, which extends orthogonally relative to the longitudinal direction of the storage chutes in the embodiment shown.

FIGS. 11*a* to 11*f* each show cross-sections of a storage chute, specifically in various stages of a replacement of a chute base. FIG. 11*a* shows a sectional view of a storage chute filled with medicine packages 6, where it is evident that a chute base 130 rests on a support section 161 of a chute partition 120. A blocking device 140 is arranged at the retrieving end of the storage chute, said blocking device including a main body 141 and a stopping means 142, which can be retracted and extended. In FIG. 11*a*, this stopping means 142 is extended such that the medicine packages 6 stored in the storage chute are held in the chute.

An empty storage chute is shown in FIG. 11*b* for simplicity, where the stopping means 142 of the blocking device 140 has been retracted into the main body 141. In order to then permit the old, soiled chute base 130 to be removed, this chute base is first lifted slightly at the retrieving end of the chute base. This is possible, since it is provided according to the present disclosure that the chute base merely rests on the support device and can be moved substantially in the vertical direction of the storage chute.

In FIG. 11*d*, it is evident that the new chute base 130' has already been slid by approximately ⅓ of the length thereof underneath the old chute base 130, where the new chute base 130' rests on the support section 161 during insertion.

In FIG. 11*e*, it is evident that the new chute base 130' has been slid, in entirety, underneath the old chute base and the two chute bases are arranged one above the other. Next, the old chute base 130 is removed, and the new chute base 130' takes the place of the original chute base 130, as is evident in FIG. 11*f*. After the new chute base 130' is in the final position thereof, this chute base is secured against sliding in the longitudinal direction of a chute by means of a (non-illustrated) holding means; for example, this can be implemented by means of a stop at the blocking device 140 or by means of a (non-illustrated) holding means at the insertion end of the storage chute.

The insertion of a new chute base having an empty storage chute was shown in FIGS. 11*a*-11*f*. The method according to the present disclosure also makes it possible, however, to replace a chute base without removing all the medicine packages. If the new chute base is inserted or slid underneath via the retrieving end, then it must be ensured, however, that no medicine packages fall out when the old chute base is lifted. This problem does not occur if the new chute base is inserted via the stocking end, since the stopping means 142 do not need to be retracted during insertion.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A picking device for piece goods, comprising:
   at least one shelf row having at least one shelf having a shelf base extended in a plane and comprising a plurality of storage chutes,
   at least one retrieving device, from which piece goods can be retrieved,
   wherein the shelf base has a frame structure, a plurality of chute partitions, a plurality of chute bases, and a plurality of blocking devices that are coupled to a control device,
   wherein each of the plurality of chute bases and two chute partitions define one elongate storage chute that extends in a longitudinal direction and that has a stocking end and a retrieving end, the retrieving end adjacent the at least one retrieving device, wherein each of the plurality of blocking devices is arranged at the retrieving end of a corresponding elongate storage chute, and wherein each of the plurality of chute bases rests upon a corresponding support device which is formed from portions of two chute partitions and which is configured such that a replacement chute base can be slid between the resting chute base and the corresponding support device, and
   a holder for each elongate storage chute that restricts the chute base of that elongate storage chute from sliding in the longitudinal direction of that storage chute when the chute base of that storage chute is placed on the corresponding support device.

2. The picking device for piece goods according to claim 1, wherein the picking device comprises:
   an operating device configured to be displaced horizontally and vertically in front of the at least one shelf row and is coupled to the control device, and
   a stocking device configured to move piece goods into the picking device, wherein the operating device is configured to remove the piece goods from the stocking device.

3. The picking device for piece goods according to claim 1, wherein the corresponding support device of each chute base is configured such that the respective chute base is supported by that support device and is free to move perpendicularly away from that support device.

4. The picking device for piece goods according to claim 1, wherein each of the chute partitions comprises two support sections, and wherein each of the support devices is formed form one of the support sections of two different chute partitions.

5. The picking device for piece goods according to claim 1, wherein the holder of each elongate storage chute is formed on the chute base of that elongate storage chute at the stocking end of that elongate storage chute.

6. The picking device for piece goods according to claim 1, wherein each chute base comprises at least one articulated section.

7. The picking device for piece goods according to claim 1, wherein each chute base comprises a sensor coupled to the control device and configured (i) to determine a degree of soiling of that chute base and (ii) to forward the degree of soiling to the control device.

8. The picking device for piece goods according to claim 1, wherein each chute base comprises a combination detection and display device configured to determine and display a degree of soiling of that chute base.

* * * * *